(12) United States Patent
Toews

(10) Patent No.: US 8,210,476 B2
(45) Date of Patent: Jul. 3, 2012

(54) KIT FOR MODIFYING A STRUT OF AN AIRCRAFT WITH AN AERODYNAMIC COVER

(76) Inventor: Garold Toews, Grand Prairie (CA)

( * ) Notice: Subject to any disclaimer, the term of this patent is extended or adjusted under 35 U.S.C. 154(b) by 179 days.

(21) Appl. No.: 12/813,445

(22) Filed: Jun. 10, 2010

(65) Prior Publication Data

US 2010/0320326 A1    Dec. 23, 2010

(30) Foreign Application Priority Data

Jun. 18, 2009 (CA) .................. 2669000

(51) Int. Cl.
*B64C 1/38* (2006.01)
(52) U.S. Cl. ................................. 244/130
(58) Field of Classification Search ........... 244/130, 244/129.1
See application file for complete search history.

(56) References Cited

U.S. PATENT DOCUMENTS

| | | | | |
|---|---|---|---|---|
| 1,104,254 | A | * | 7/1914 | Eddelbuttel .............. 244/130 |
| 1,333,620 | A | * | 3/1920 | Kemp ....................... 244/130 |
| 1,446,761 | A | * | 2/1923 | Mix ............................ 52/84 |
| 2,017,207 | A | * | 10/1935 | Hathorn ................... 244/130 |
| 2,126,785 | A | * | 8/1938 | Laddon .................... 244/130 |
| 2,263,365 | A | | 11/1941 | Nicolaus |
| 2,397,957 | A | * | 4/1946 | Freeman ................... 114/243 |
| 2,399,186 | A | | 4/1946 | Hunter |
| 2,404,394 | A | | 7/1946 | Miller |
| 2,435,956 | A | * | 2/1948 | Craig ........................ 174/95 |
| 3,075,730 | A | * | 1/1963 | Halstead ................. 244/104 R |
| 3,086,730 | A | | 4/1963 | Crist |
| 3,330,502 | A | | 7/1967 | Colville |
| 4,165,849 | A | | 8/1979 | Fox |
| 5,346,162 | A | | 9/1994 | Belie |
| 5,845,827 | A | | 12/1998 | Reising |
| 5,961,067 | A | | 10/1999 | Hall |
| 6,341,747 | B1 | | 1/2002 | Schmidt |
| 6,475,610 | B1 | | 11/2002 | Keener |
| 6,610,394 | B2 | | 8/2003 | Keener |
| 7,051,845 | B2 | | 5/2006 | Thorp |
| 7,334,759 | B2 | | 2/2008 | Castillo |
| 7,384,015 | B2 | | 6/2008 | Dazet |
| 7,958,966 | B2 | * | 6/2011 | Smith ....................... 181/264 |
| 2003/0173454 | A1 | | 9/2003 | Brown |
| 2005/0254955 | A1 | | 11/2005 | Helder |
| 2010/0170993 | A1 | * | 7/2010 | Misegades ................ 244/130 |

FOREIGN PATENT DOCUMENTS

| | | | |
|---|---|---|---|
| CA | 851575 A | 9/1970 | |
| FR | 2 542 698 A1 | 9/1984 | |
| GB | 555700 | 9/1943 | |
| GB | 2231316 A | * 11/1990 | .............. 244/130 |
| WO | 2006/070014 A1 | 7/2006 | |

* cited by examiner

*Primary Examiner* — Christopher P Ellis
(74) *Attorney, Agent, or Firm* — Christensen O'Connor Johnson Kindness PLLC

(57) ABSTRACT

A kit for modifying a strut of an aircraft with an aerodynamic cover includes a rigid sheath formed from a first portion and a second portion. Each of the first portion and the second portion have a curved shape. The rigid sheath includes an angled leading edge and an angled trailing edge. Convex surfaces connect the leading edge and the angled trailing edge. There is an attachment for attaching the rigid sheath to the strut, the attachment securing the sheath to the strut such that the strut is positioned at the camber of the rigid sheath.

9 Claims, 2 Drawing Sheets

KIT FOR MODIFYING A STRUT OF AN AIRCRAFT WITH AN AERODYNAMIC COVER

FIELD

A kit for modifying a strut of an aircraft with an aerodynamic cover

BACKGROUND

On small aircraft, struts are located on the sides to provide stability to the wings of the aircraft. These struts have an oval cross-section with a rounded front and back.

SUMMARY

There is provided a kit for modifying a strut of an aircraft with an aerodynamic cover, the strut having a length, a first end attached to a body of the aircraft, and a second end attached to a wing of the aircraft, the strut providing structural support to the wing. The kit comprises a rigid sheath and an attachment for attaching the rigid sheath to the strut. The rigid sheath having a first portion and a second portion, and a length that is substantially the same as the length of the strut. The rigid sheath comprises an angled leading edge between the first portion and the second portion, an angled trailing edge between the first portion and the second portion, each of the first portion and the second portion having convex surfaces.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
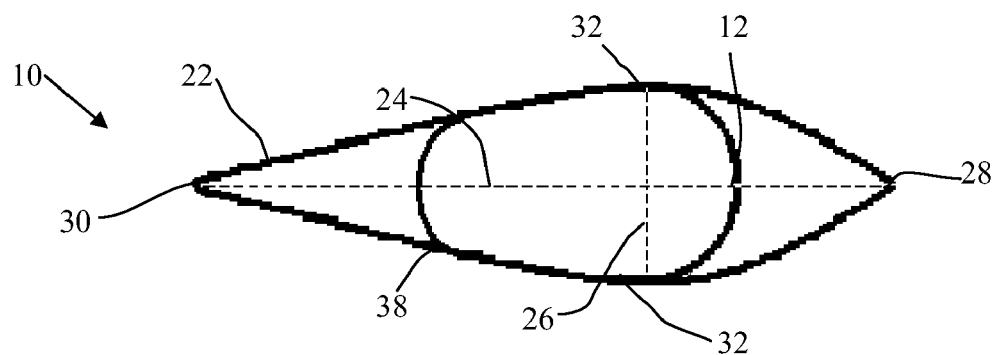
FIG. 1 is a sectional top view of the sheathing and strut.
Figure 3:
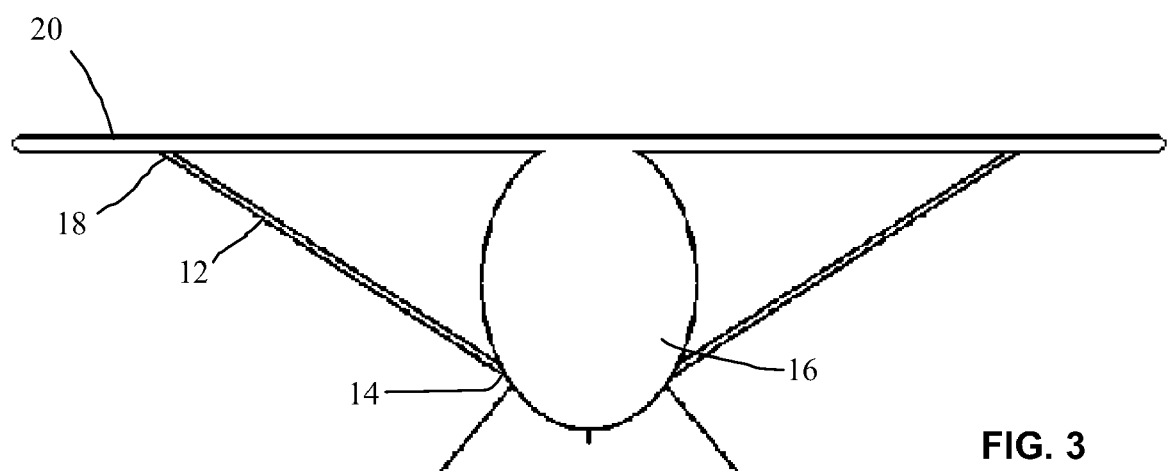
FIG. 3 is a front elevation view of an aircraft.

A kit for modifying a strut of an aircraft generally identified by reference numeral 10, will now be described with reference to FIG. 1 through FIG. 5.
Structure and Relationship of Parts:

Referring to FIG. 3, the strut 12 has a first end 14 attached to a body of the aircraft 16, and a second end 18 attached to a wing 20 of the aircraft. The strut 12 provides structural support to the wing 20.

Figure 2:
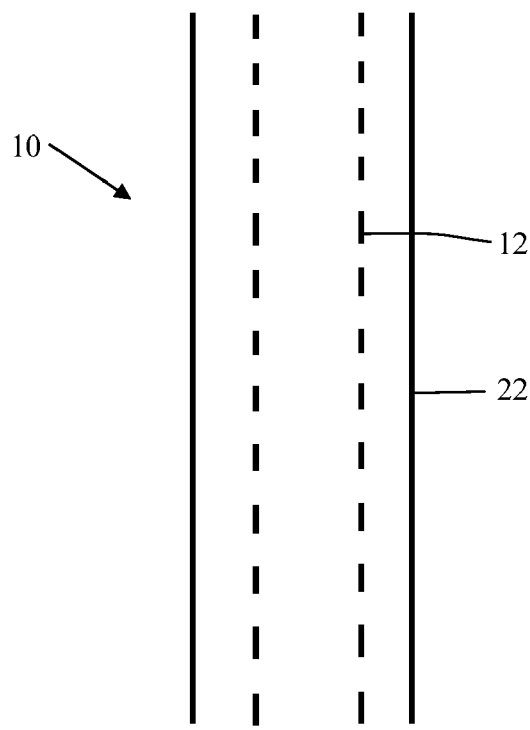
FIG. 2 is a sectional side view of the sheathing and strut.
Figure 4:
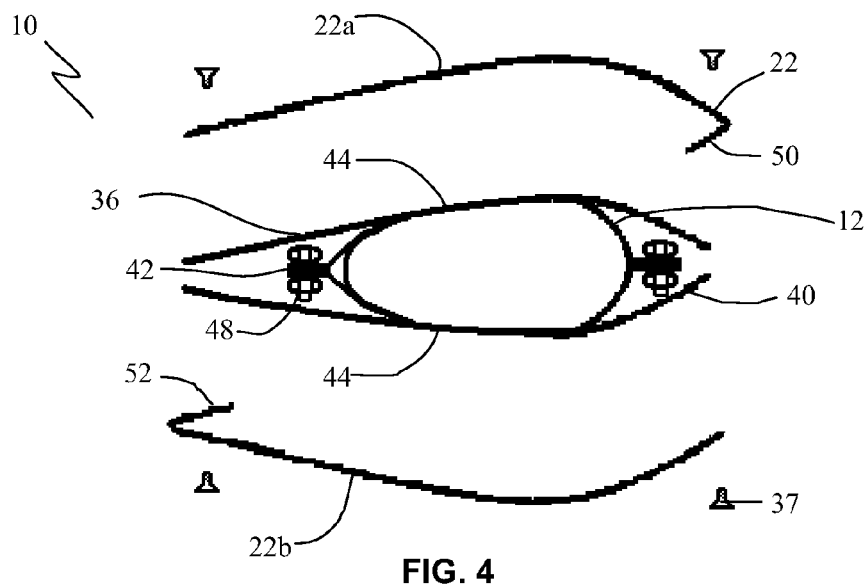
FIG. 4 is a partially exploded top plan view of the kit.

Referring to FIG. 1 and FIG. 2, kit 10 includes a rigid sheath 22 that has a length that is substantially the same as the length of the strut 12 that it is intended to cover. When assembled, rigid sheath 22 has an angled leading edge 28 and an angled trailing edge 30. Referring to FIG. 4, rigid sheath 22 is preferably made from two side portions 22a and 22b. The angle of angled leading edge 28 is between 30 and 90 degrees as measured from one face to another face (or 15 to 45 degrees measured from center), and the angle of angled trailing edge 30 is being between 10 and 30 degrees as measured from one face to another face (or 5 to 15 degrees as measured from center). The angle of trailing edge 30 is less than the angle of leading edge 28 in order to achieve the tapered aerodynamic shape shown in FIGS. 1 and 4. Referring to FIG. 1, rigid sheath 22 is defined by a chord 24, which is the distance between the angled leading edge 28 and the angled trailing edge 30, and a camber 26, which is the distance between the convex surfaces 32 of sheath 22 at the point of maximum separation, as shown. Preferably, the ratio between the chord and the camber is between 4:1 and 8:1. Convex surfaces 32 connect the angled leading edge 28 and the angled trailing edge 30. The camber 26 is positioned at a point between 10 and 50 percent along the length of the chord 24 beginning at the angled leading edge 28.

Figure 5:
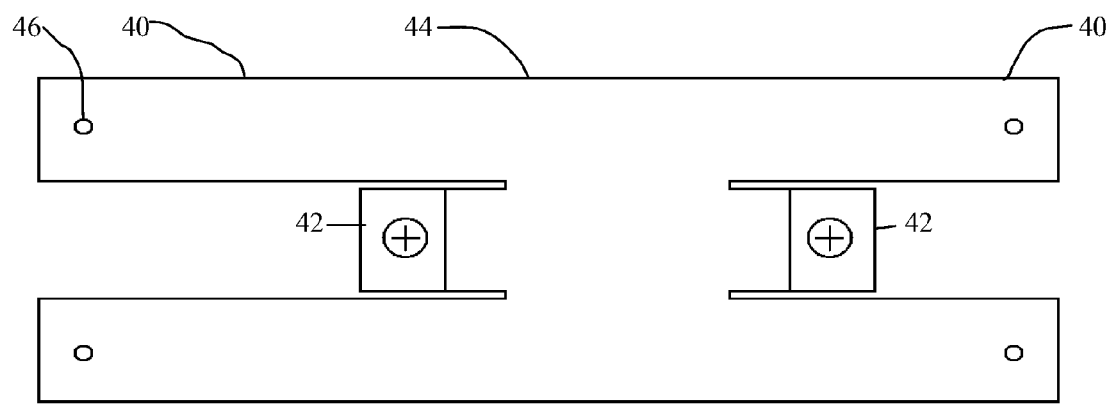
FIG. 5 is a side elevation view of the clamp.

Referring to FIG. 4 and FIG. 5, kit 10 includes an attachment 36 for attaching the rigid sheath 22 to the strut 12. Referring to FIG. 5, the attachment 36 includes a clamp 44 that has sheath attachment portions 40 with pin receiving openings 46 and clamping portions 42. Referring to FIG. 4, the clamp 44 depicted in the preferred embodiment is a two part clamp where the depicted clamp 44 is attached to either side of the strut 12 and that, referring to FIG. 4, are attached together by clamping portions 42 using, for example, a nut and bolt combination 48. The number of clamps 44 and their spacing along strut 12 will depend on the strength and size of the clamps 44 and the desired stability. Furthermore, the actual design of the clamp 44 may vary. For example, the method of attaching the clamp 44 to the strut 12 may vary, and, while there are two sheath attachment portions 40 on each side of clamp 44, it will be understood that modifications may be made, depending on the preferences of the manufacturer or user. Sheath attachment portions 40 are used to attach rigid sheath 22 to clamp 44, and therefore strut 12 by using screws 37. As shown, rigid sheath 22 is made up of two portions 22a and 22b. The first portion 22a has a leading edge fairing 50 and the second portion 22b has a trailing edge fairing 52, such that the fairings 50 and 52 overlap the other portion. Screws 37 are then inserted through the overlap between the fairing 50 and 52 and the respective portion 22a or 22b and engage the sheath attachment portion 40 of the clamp 44 to secure the sheath 22 to the strut 12. Preferably, sheath attachment portions 40 are rounded shaped and sized to correspond with the shape of the sheath 22.

Operation:

Referring to FIG. 4, the kit 10 is applied to the strut 12 of an aircraft. A clamp 44 is attached to the existing strut 12 using a nut and bolt combination 48. The rigid sheath 22 attaches to the attachment portion 40 by way of screws 37 inserted through fairings 50 and 52. Referring to FIG. 1, the rigid sheath 22 is installed such that it has an angled leading edge 28 and an angled trailing edge 30 where the angle of the trailing edge 30 is less than the angle of the leading edge 28. The rigid sheath 22 is positioned such that the camber 26 is positioned at a point between 10 and 50 percent along the length of the chord 24 beginning at the angled leading edge 28.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A kit for modifying a strut of an aircraft with an aerodynamic cover, the strut having a length, a first end attached to a body of the aircraft, and a second end attached to a wing of the aircraft, the strut providing structural support to the wing, the kit comprising:
   a rigid sheath having a first portion and a second portion, the rigid sheath having a length that is substantially the same as the length of the strut, the rigid sheath comprising:
      an angled leading edge between the first portion and the second portion;
      an angled trailing edge between the first portion and the second portion;
      each of the first portion and the second portion having convex surfaces; and
   an attachment for attaching the rigid sheath to the strut.

2. The kit of claim 1, wherein the ratio of the chord to the camber is between 4:1 and 8:1.

3. The kit of claim 1, wherein the angle of the angled leading edge is between 30 and 90 as measured from the first portion to the second portion.

4. The kit of claim 1, wherein the angle of the angled trailing edge is between 10 and 50 degrees measured from the first portion to the second portion.

5. The kit of claim 1, wherein a camber of the rigid sheath is positioned at a point between 10 and 30 percent of the distance between the angled leading edge and the angled trailing edge as measured from the angled leading edge.

6. The kit of claim 1, wherein the attachment secures the sheath to the strut such that the strut is positioned at a camber of the rigid sheath.

7. The kit of claim 1, wherein the first portion and the second portion of the rigid sheath are distinct, the first portion having a leading edge fairing that overlaps the leading edge of the second portion, the second portion having a trailing edge fairing that overlaps the trailing edge of the first portion.

8. The kit of claim 1, wherein the attachment comprises a strut clamp having a strut attachment portion for attaching to the strut, and a sheath attachment portion for attaching to the sheath.

9. The kit of claim 8, wherein the strut clamp comprises a first clamp portion and a second clamp portion, the first clamp portion and the second clamp portion being secured to each side of the strut, at least one of the first and second clamp portions having sheath attachment portions that extends outward toward the leading edge and the trailing edge, the sheath being pin connected to the respective sheath attachment portion toward the leading edge and the trailing edge.

* * * * *